United States Patent
Hemmings

(10) Patent No.: US 6,693,660 B2
(45) Date of Patent: Feb. 17, 2004

(54) METHOD AND APPARATUS FOR CONTROLLING AN ACOUSTO-OPTIC MODULATOR

(75) Inventor: John Robert Hemmings, Bedfordshire (GB)

(73) Assignee: Fujifilm Electronic Imaging Limited, Herts (GB)

( * ) Notice: Subject to any disclaimer, the term of this patent is extended or adjusted under 35 U.S.C. 154(b) by 0 days.

(21) Appl. No.: 09/834,270

(22) Filed: Apr. 12, 2001

(65) Prior Publication Data

US 2001/0029863 A1 Oct. 18, 2001

(30) Foreign Application Priority Data

Apr. 13, 2000 (GB) ............................................. 0009134

(51) Int. Cl.$^7$ ................................................. B41J 2/47
(52) U.S. Cl. ........................ 347/252; 347/253; 347/254
(58) Field of Search ................................. 347/252, 253, 347/254, 255; 369/119; 359/204

(56) References Cited

U.S. PATENT DOCUMENTS

| | | | | | |
|---|---|---|---|---|---|
| 5,223,857 A | * | 6/1993 | Loce et al. | ................. | 346/108 |
| 5,255,014 A | * | 10/1993 | Haneda et al. | .............. | 346/108 |
| 5,502,709 A | * | 3/1996 | Shinada | ....................... | 369/119 |

* cited by examiner

*Primary Examiner*—Stephen D. Meier
*Assistant Examiner*—Lam Nguyen
(74) *Attorney, Agent, or Firm*—Sughrue Mion, PLLC

(57) ABSTRACT

A method is provided of modifying pulsed image data signals for controlling an acousto-optic modulator in an image setter system. The method comprises modifying the pulse widths of the image data signals in accordance with predetermined parameters so as to improve the correspondence between the data representing the image and the data recorded on the record medium. Following modification the data signals are supplied to the acousto-optic modulator.

33 Claims, 4 Drawing Sheets

METHOD AND APPARATUS FOR CONTROLLING AN ACOUSTO-OPTIC MODULATOR

FIELD OF THE INVENTION

The present invention relates to a method and apparatus for controlling an acousto-optic modulator, particularly in connection with an image setter system.

DESCRIPTION OF THE PRIOR ART

In a conventional drum image setter for exposing printing plates, a plate is positioned around the surface of a drum and a 45° spinning mirror (spinner) traverses the length of the plate along the axis of the drum (the "slow scan direction"). A laser beam is passed along the drum axis onto the mirrored surface of the rotating spinner which directs the beam along a circumferential line around the drum across the printing plate emulsion in the "fast scan direction".

As the laser is passed over the printing plate surface, it is modulated to produce the half-tone dots on the plate for use by a printing press.

In comparison to the photographic emulsion used for film, the emulsions used for printing plates and thermal plates are less sensitive, requiring longer exposure times. The productivity of an image setter depends upon the image resolution and the exposure time for each pixel. Fast exposure times are desirable for increased productivity and therefore the spinner speed must be as high as possible. A typical spinner speed is 30000 rpm. Greater productivity can also be achieved by using multi-beam machines, that is having several lasers or one laser with multiple beams derived from it.

Each printing plate is normally used many times in image printing and the plate lifetime on the press depends on the exposure level of image recorded on the plate. If the exposure level is too low then the highlight dots quickly wear off and therefore printing plates are often overexposed to improve their life on the press. Overexposure can be achieved using higher powered lasers which are used to overexpose the plates in the minimum amount of time. Higher powered lasers are also required for low resolution images as the reduced amount of data allows faster scan speeds to be used and therefore more laser power is required to achieve the energy density in a shorter time.

In order to meet these power requirements, lasers having a power of several hundred milliwatts are desirable. Although modern lasers are often based upon laser diode technology, the direct modulation of laser diodes often does not provide enough power. A convenient solution to this problem is to use a continuous wave (CW) laser followed by an acousto-optic modulator (AOM) to amplitude modulate the power. The AOM requires modulation at the rate at which individual dots are placed on the printing plate. This is known as the dot clock rate and a typical frequency is 80 MHz.

In a conventional acousto-optic modulator, a collimated laser beam is focused into an acousto-optic crystal. To modulate the AOM in accordance with a pulsed data stream, the data stream is passed to an AOM driver which amplitude modulates a radio frequency (RF) signal. The modulated RF signal is then fed to a transducer which causes a pulsed acoustic wave to travel across a transverse direction of the crystal in accordance with the data stream pulses.

The focused beam passes through the crystal material whilst acoustic waves pass through the same material in the transverse direction normal to that of the beam. The acoustic wave acts as a diffraction grating which gives a first order diffracted beam at the Bragg Angle. This diffracted beam is passed through an aperture plate and is used to record the data on the printing plate. When the acoustic wave is off (not present) the beam is not diffracted and is stopped by the aperture. This method produces the desired modulation of the laser beam.

A number of problems are encountered in image setter systems of this type.

For high speed image setters, the "on" period of the modulated laser beam must be as short as possible and two limitations which affect AOMs are the width of the beam waist in the crystal and the acoustic wave velocity in the crystal. The rise time is a function of the time it takes for the acoustic wave to traverse the beam waist. A wide beam waist increases the beam rise time, in addition to any inherent rise time in the combined data signal pulses. The beam waist can be reduced but this is limited by the fact that small beam waists can cause damage to the crystal and therefore a loss of efficiency. The propagation velocity of the acoustic waves is fixed by the material properties of the crystal and therefore cannot be changed to reduce the rise time.

At high speeds, effects due to the acoustic wave velocity may become noticeable. In a typical image setter system with a 30000 rpm spinner, the rise time of the modulated laser pulse is usually between 5 and 8 ns. A single dot at 96 dots per mm resolution has a typical width of 12 ns and therefore it can be seen that the rise time is a very significant fraction of the dot width for high resolution image dots.

In particular, three undesirable effects can be identified in the recorded data which result from the use of a spinner and/or an AOM.

The first effect is that high rotation speeds of the spinner cause the beam to be smeared over the printing plate surface. Therefore horizontal lines are widened due to smearing. In addition, because the plates are conventionally overexposed, horizontal dark lines are accentuated which increases the dot widths for modulated laser pulses in which the rise and fall times are significant.

A second problem in image setters with acousto-optic modulators is that the acoustic wave velocity of around 4000 metres per second is similar to that of the writing velocity of the laser across the printing plate. Typically this writing velocity is about 1000 metres per second. The travelling acoustic wave causes a shift of the beam spatially across the aperture during the rise and fall times of each laser pulse. Due to the rotation of the spinner, this spatial shift acts in the same direction as the spinner rotation at one part of its revolution and in the opposite direction at points diametrically opposed. This causes a resultant modulation of horizontal line widths in a sinusoidal manner with a frequency of 1 cycle per revolution of the spinner.

The third effect occurs because an off-axis diffracted beam is used to record the data. The diffracted beam has an inherent ellipticity caused by the beam diffraction at the Bragg angle with respect to the zero order beam of the acousto-optic diffraction grating. However, as an ellipse has two fold rotational symmetry, the frequency of this sinusoidal variation is two cycles per revolution. In combination with the spinner rotation, the resultant horizontal lines are again modulated in width sinusoidally but this time at a frequency of two cycles per revolution of the spinner. In addition, vertical lines are similarly affected by the ellipticity but the effect is 90° out of phase with that of the corresponding horizontal lines.

Therefore these problems with conventional AOM based image setter systems, can cause a reduced correspondence between the original pulsed data representing the image and the image as recorded.

SUMMARY OF THE INVENTION

In accordance with a first aspect of the present invention we provide a method of modifying pulsed image data signals for controlling an acousto-optic modulator in an image setter system in which a radiation beam impinging on a record medium is modulated by the acousto-optic modulator, the method comprising:

modifying the pulse widths of the image data signals in accordance with predetermined parameters to improve the correspondence between pulsed image data and the data recorded on the record medium; and supplying the modified pulsed signals to the acousto-optic modulator.

The present invention conveniently provides a method of addressing the earlier identified problems of AOM image setter systems by modifying the pulsed image data to counteract these problems. As a result, the data recorded on the record medium may more closely represent the original pulsed image data prior to modification.

In image setter systems where the image data are recorded using a radiation beam and where relative movement is provided between the radiation beam and the record medium, typically each pulse width is modified to compensate for the relative motion between the radiation beam and the record medium. This addresses the smearing effect caused by the relative motion of the beam and the record medium.

Although a number of radiation beam types may be used to record the data, preferably the radiation beam is a laser beam. As the smearing serves to broaden the horizontal lines of the image, the pulses are preferably reduced in width by a constant absolute value.

When the acousto-optic modulator uses acoustic waves propagating within a crystal to modulate the radiation beam, the pulse widths of the image data signals are preferably varied sinusoidally to compensate for the shift in the beam caused by the wave propagation.

The sinusoidal variations of these pulse width modifications will be preferably substantially equal in frequency to the rotational frequency of the spinner.

The problem of beam ellipticity may also be addressed using the present invention. Preferably when the beam output from the acousto-optic modulator is elliptical and the image recording is controlled using a rotating spinner, the pulse width of the image data signals is varied sinusoidally with a frequency substantially equal to twice the rotational frequency of the spinner.

For each sinusoidal modification of the pulsed image data signals, it will be appreciated that the amplitude and phase may be dependent upon the specific configuration of the scanner system used.

Typically the pulsed image data signals will represent digital data as a square wave, each square wave having a high level component, a low level component and rise and fall time components linking the high and low level components. Such square wave pulses may be modified in pulse width by expanding at least one of the rise time and fall time components such that a threshold level of amplitude may be defined which in general will lie between the high and low level components and will intersect the rise time and fall time components for each pulse.

By expanding one or both of the rise time and fall time components along a time axis, at least one of the high level or low level component's of the pulses will be shortened in duration if the overall data rate is to be maintained. In general, the threshold level of amplitude will be defined such that the modified pulse width at the threshold level is substantially equal to the width of the high level components of the pulse as received before modification. This width may be defined as the distance along the time axis between the intersection points of the threshold level beneath the high level component, with the rise time and fall time components.

The threshold level may be raised or lowered between the high and low levels. If upon later conversion to a square wave output, the output pulse is ensured to have a high level component substantially equal in width to the width of the pulse at the threshold level, then altering the threshold level causes the pulse width of the square wave output to be modified.

A width modified square wave having a width substantially equal to the width of the high level component, will have a corresponding low level component either reduced or increased in length if the data rate is to be maintained.

For each modification that may be applied to the image data signals, for a particular image setter and corresponding point during the scan, the appropriate modification to be used may be derived from data contained in a look-up table.

In accordance with a second aspect of the present invention, we provide a radiation beam modulation system comprising:

an acousto-optic modulator for modulating a radiation beam impinging on a record medium; and a signal processor arranged to modify pulsed image data signals for controlling the acousto-optic modulator, by modifying the pulse widths of the image data signals in accordance with predetermined parameters to improve the correspondence between pulsed image data and the data recorded on the record medium.

The acousto-optic modulator will typically comprise a crystal in which acoustic waves are propagated to diffract the radiation beam, producing at least one beam at the Bragg angle.

In general, the zero order radiation beam will be blocked by an aperture plate having an aperture arranged to allow passage through the plate of radiation diffracted at the Bragg angle.

Typically, the image data pulses will be square wave pulses having a high level component, a low level component and rise and fall time components in between the high and low levels. The system may further comprise an integrator to modify the pulses by expanding at least one of the rise and fall time components, and in addition may be provided with a comparator to compare the modified pulses with a reference signal.

Preferably, the amplitude of the reference signal with respect to the high and low amplitude levels of the square wave pulses will be used to control the modification of the pulse widths.

In turn, the reference level will preferably be controlled to effect the modifications of the pulse widths and the control of this reference level may be achieved in accordance with a look-up table. The beam modulator system may therefore further comprise a store in which the look-up table may be contained for controlling the reference signal in accordance with the predetermined parameters of the system.

In accordance with a third aspect of the present invention we provide an image setter system including a radiation beam source, a record medium support, a device for causing relative motion between the radiation beam and the record medium support and a beam modulator system according to the second aspect of the invention.

Typically, the device for causing relative motion between the beam and the record medium support is a spinner arranged to direct the radiation beam across the record medium.

The present invention therefore provides a convenient way of addressing the problems encountered in many image setter systems, which result in a reduced correspondence between the image data and the recorded data. In addition to drum image setter systems, it will be appreciated that the invention is also applicable to many other scanner systems, for example those having a "flat-bed" configuration.

BRIEF DESCRIPTION OF THE DRAWINGS

An example of an apparatus and method for modifying pulsed image data signals will now be described with reference to the accompanying drawings, in which.

DETAILED DESCRIPTION OF EMBODIMENTS

Figure 1:
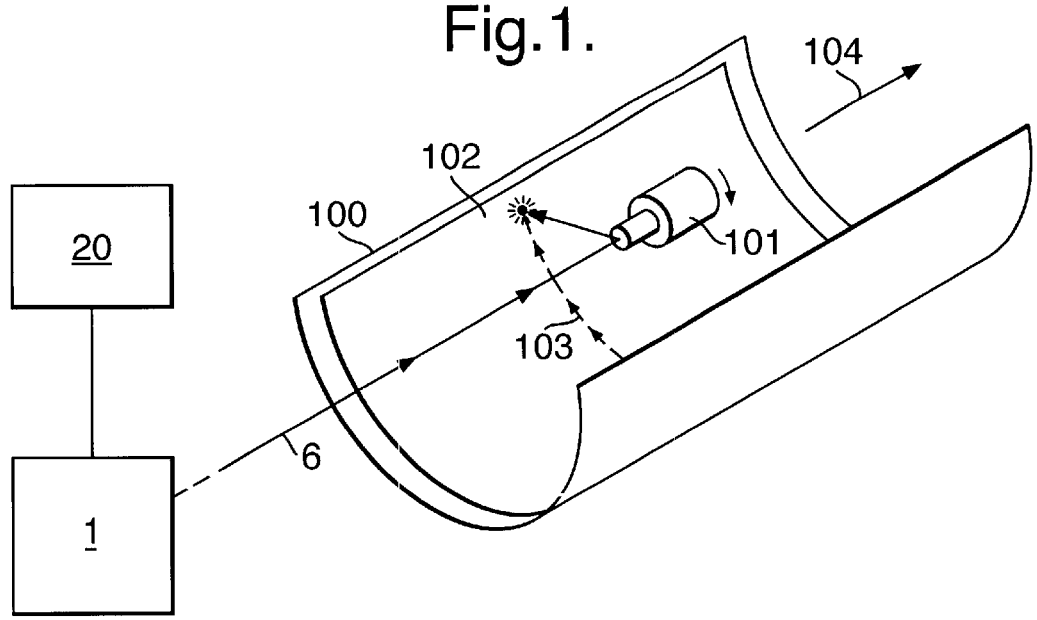
FIG. 1 illustrates a drum image setter system according to a first example.

FIG. 1 shows a drum image setter system in which an acousto-optic modulator 1 controlled by a signal processor 20 modulates a collimated laser beam 6. The modulated laser beam is directed along the axis of a drum 100 of the scanner and impinges upon a rotating spinner 101. A printing plate 102 is located on the internal surface of the drum. The rotating spinner scans the modulated laser beam 6 across the plate's surface in a fast scan direction 103. The spinner 101 is also driven incrementally along the axis of the drum (in a slow scan direction) as indicated by the arrow 104 so as to produce an image on the printing plate 102 by cumulative scanning.

A number of undesirable effects as described earlier may be introduced into the recorded image by the apparatus, reducing the correspondence between the recorded image and the pulsed image data. The three effects mentioned earlier and corresponding pre-corrections using pulse width modification which may be applied according to the present invention will now be described.

Figure 2:
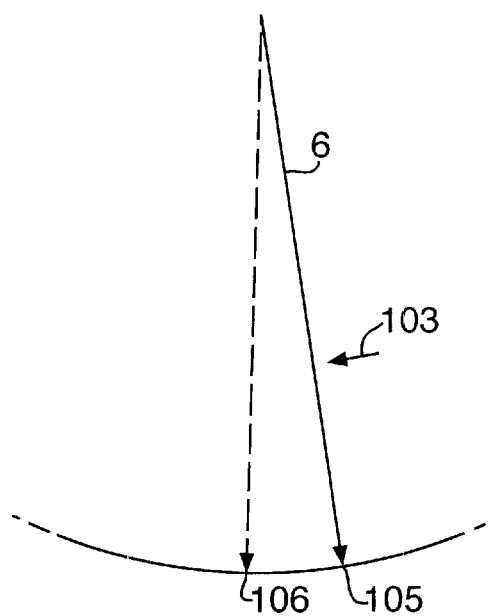
FIG. 2 illustrates the effect of beam smearing.

The smearing effect caused by the movement of the spinner during each pulse is illustrated in FIG. 2. For each pulse, the scanning of the beam 6 due to the motion of the spinner 101 causes the beam to move across the surface of the printing plate from a starting point 105 to a finishing point 106. This broadens the recorded dots, as illustrated in FIG. 4A.

Figure 4A:
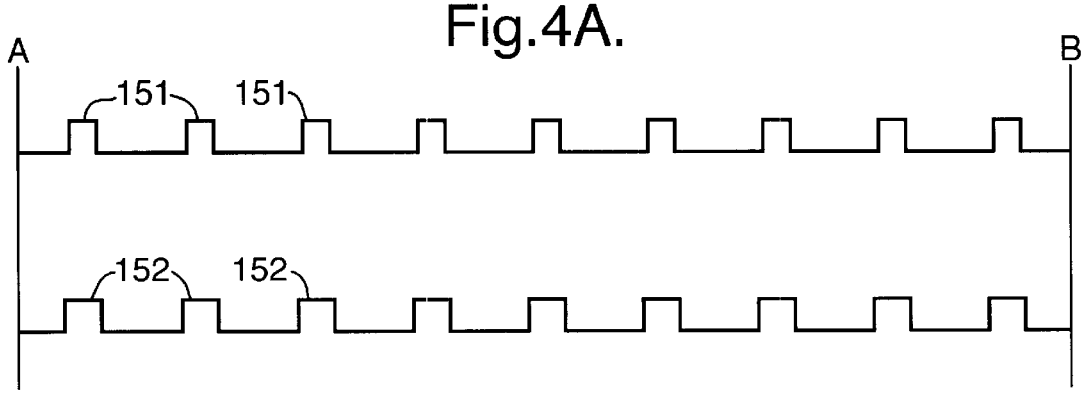
FIGS. 4a to 4c illustrate pulse modifications due to three apparatus effects.

FIG. 4A shows the smearing effect for a scan line in the fast scan direction 103 from the start of the scan line at point A, to the end at point B. A large number of image data pulses are indicated at 151, which represent the image data as received by the signal processor 20. In this case each image data pulse is of similar width. The smearing of these pulses due to the motion of the spinner causes them to be broadened producing recorded pulse widths as indicated at 152.

This effect may be counteracted by a "DC" correction to the pulse widths. The magnitude of the effect depends on the spinner to record medium distance and the spinner velocity. Typically this may be corrected by shortening the pulse duration by approximately 4 ns with a typical spinner operating at 30000 rpm. As this correction is applied to all data, the signal offset is a DC term which is similar for each data pulse processed. The corrected pulses therefore resemble the pulses 151.

A second problem which may be addressed is the beam shift due to the similarity between the acoustic wave velocity and the laser writing velocity on the plate in the fast scan direction. This can be seen more clearly in FIG. 3.

Figure 3:
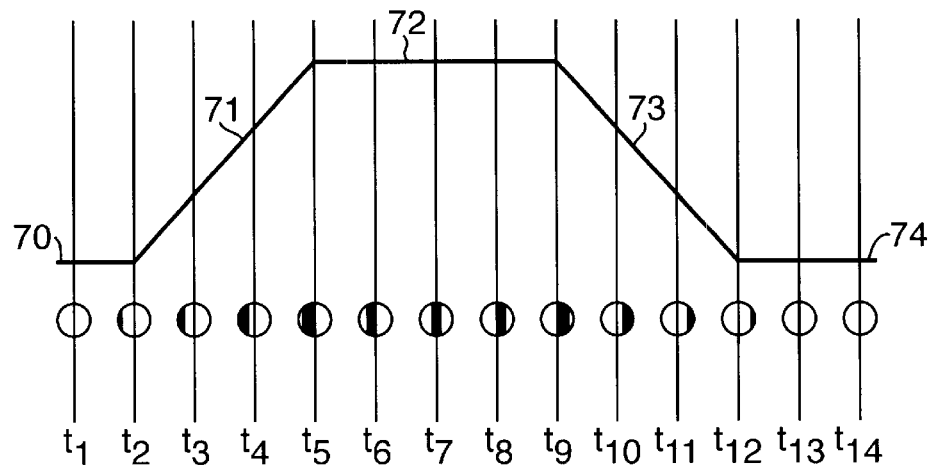
FIG. 3 shows the effect of the beam shift upon the laser pulse amplitude.

FIG. 3 indicates the effect of the passage of an acoustic wave across the beam with respect to the aperture in the aperture plate as a function of time from time $t_1$ to time $t_n$. The laser beam intensity 70 is also shown. At time $t_1$ the beam impinges upon the aperture plate such that no part of the beam passes through the aperture. At $t_2$ the edge of the beam begins to pass through the aperture as it is spatially shifted by the acoustic wave. At this point the leading edge of the acoustic wave begins to pass across the beam. The fraction of the beam passing through the aperture increases at $t_3$ and $t_4$ until both edges of the beam pass through the aperture at $t_5$. This is shown as the rise of the pulse amplitude 71.

For times $t_7$ to $t_8$ all of the beam is passed as each part of the beam encounters the acoustic wave resulting in a substantially constant beam amplitude 72. The trailing edge of the wave passes across the beam causing the fall in amplitude 72 at times $t_9$ to $t_{12}$. The beam is then fully obstructed by the aperture plate at times $t_{13}$ and $t_{14}$.

Figure 4B:
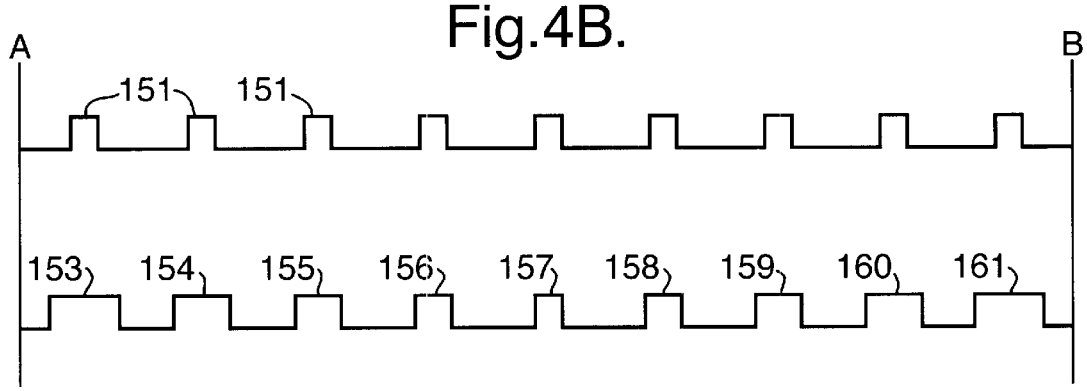

As indicated earlier, the acoustic wave velocity is of a similar order to travel velocity of the laser on the record medium. This effect interacts with the rotation of the spinner to causes a modulation of the width of horizontal lines occurs sinusoidally at one cycle per revolution of the spinner. This is illustrated in FIG. 4B. During each scan of the beam in the fast scan direction, the image data pulses 151 are subject to a sinusoidal width modification as indicated by the pulses 153 to 161.

This may be counteracted by modifying the widths of the pulses sinusoidally in antiphase to the effect by sinusoidally modifying the threshold level 68. Typically, the amplitude of such a sinusoidal variation is a fraction of the pulse amplitude. Again, the corrected pulses therefore resemble the pulses 151.

Figure 4C:
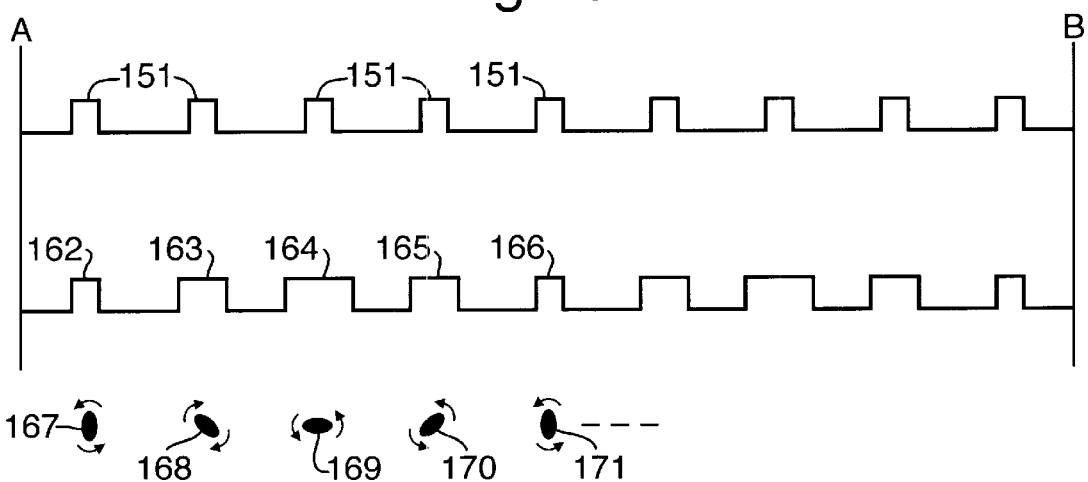

The third effect caused by the inherent ellipticity in the diffracted beam causes another sinusoidal variation in the pulse widths but with a frequency twice that of the previous effect. The resultant variation in the width of the beam at the recorded medium is sinusoidal. This can be seen in FIG. 4C. The recorded pulse widths vary between a minimum at 162, through a maximum at 164 and return to the minimum 166 in half of the scan line length A to B. The half rotation of an ellipse over a similar period 167 to 171 is also shown.

A pre-correction using an antiphase sinusoidal modification of the pulse widths at a frequency of two cycles per revolution, may be used to compensate for the elliptical effect to produce pulses as indicated at 151. The amplitude of the threshold variation to counteract this effect is only a fraction of the pulse amplitude.

An example of apparatus suitable to modify the pulse widths will now be described.

Figure 5:
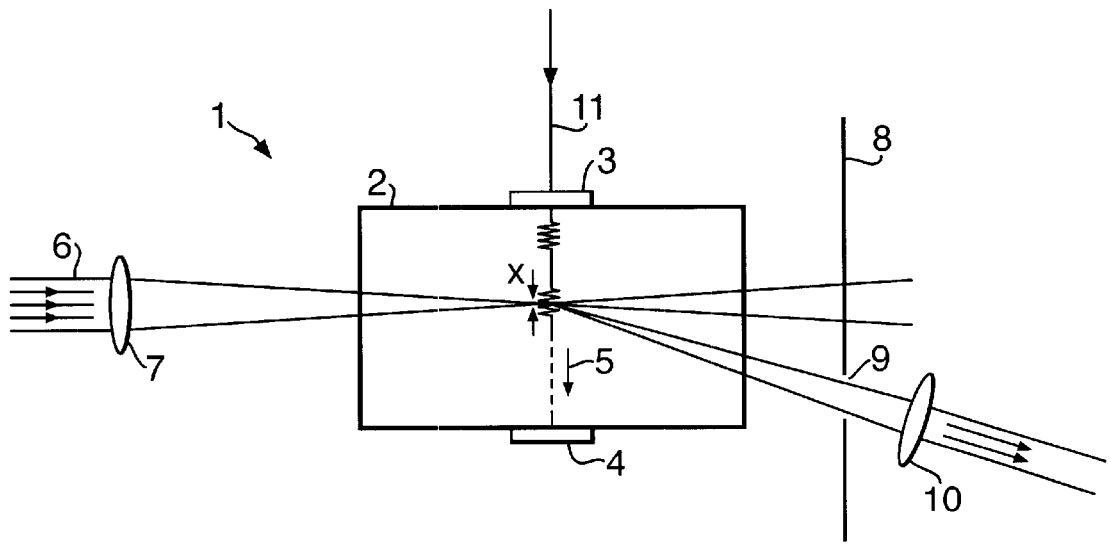
FIG. 5 is a schematic illustration of an acousto-optic modulator of the example.

FIG. 5 illustrates the acousto-optic modulator (AOM) generally indicated at 1. The AOM has an acousto-optic crystal 2 having a transducer 3 (for example a piezo-electric device) attached to one side of the crystal. The transducer 3 converts electrical signals into acoustic waves within the crystal and these pass across the crystal 2 to the opposite side where a dump 4 is arranged to absorb the acoustic waves. This minimises acoustic wave reflections within the crystal. The transducer 3 and opposed dump 4 define an acoustic wave propagation direction 5.

A collimated laser beam 6 is directed into the AOM 1 and is focused by a lens 7 such that the laser beam has a beam waist thickness X where it interacts with acoustic waves propagating from the transducer. For photopolymer plates, a suitable laser is a frequency doubled YAG laser having a primary wavelength of 532 nm.

The orientation of the focused laser beam is arranged to be normal to the propagation direction 5 of the acoustic waves. Beyond the interaction region of the crystal, the zero order divergent beam passes out of the crystal and impinges upon an aperture plate 8 where the beam is terminated. The aperture plate 8 has an aperture 9 arranged at the Bragg angle with respect to the straight through beam. The aperture 9 is of sufficient width to allow passage of the beam through the plate uninhibited. Beyond the aperture plate a further lens 10 is arranged such that the diffracted beam at the Bragg angle is collimated by the lens.

Figure 6:
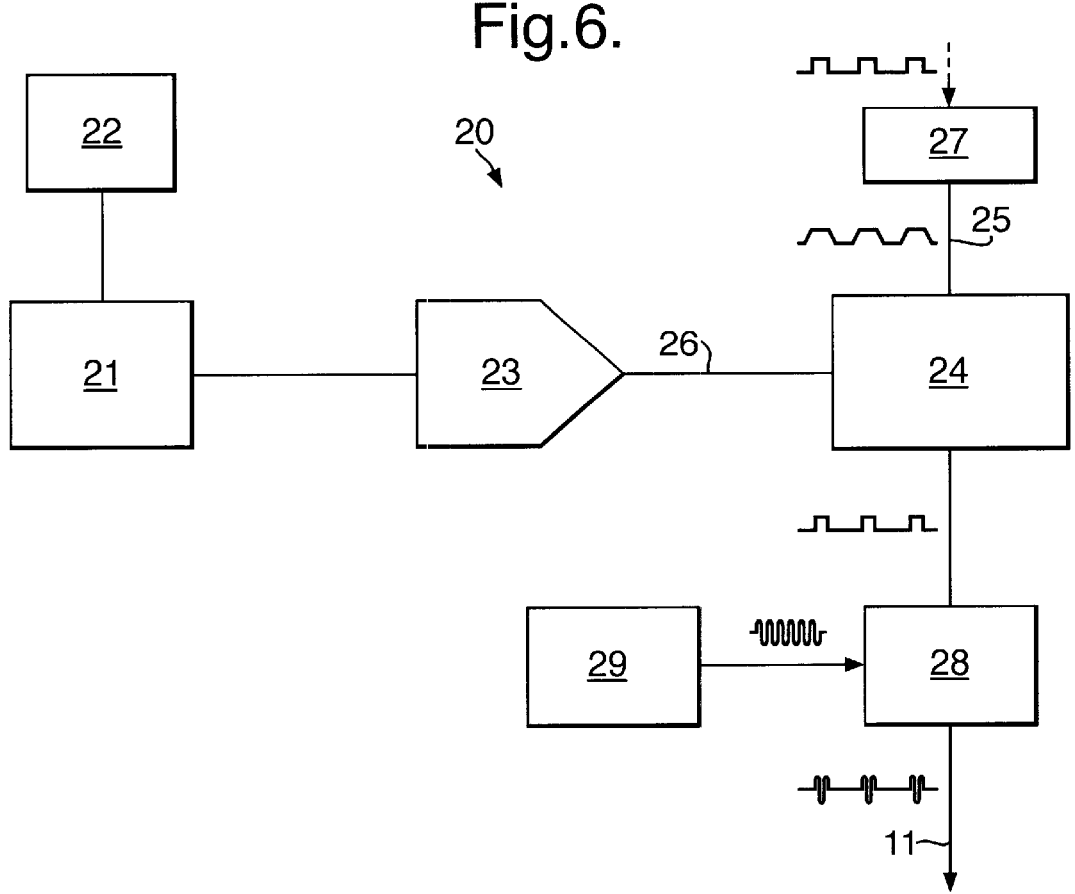
FIG. 6 is a block diagram of a signal processor according to the example.

Radio frequency image data pulses are provided from a signal processor 20 via an input line 11 to the transducer. The signal processor arranged to modify the image data in accordance with the invention is shown in more detail in FIG. 6.

The signal processor generally indicated at 20 has a central processing unit 21 which controls the scanner system using appropriate timers to synchronize the data recording with the motion of the spinner and the operation of the acousto-optic modulator 1.

The processing unit 21 determines the modification to be made to each image data pulse using a look-up table held in a store 22. As the processing unit 21 has access to the system timers and other system dependent information, an appropriate correction can be chosen for the pulsed data using this information in association with the look-up table.

The appropriate value chosen from the look-up table is converted into an analogue signal using a digital-to-analogue converter (DAC) 23. This signal is passed to a width modulator 24. The width modulator receives the pulsed image data 50 and the corresponding correction signal 60 on input lines 25 and 26 respectively.

Prior to being passed to the width modulator 24, the pulsed image data is processed by an edge modifier 27 for example containing an integrator, in order to expand the duration of the rise time and fall time components of the pulsed data. The edge modified signal is then passed to the width modulator.

The width modulator is arranged to adjust the width of each data pulse according to a threshold level. The default value of the threshold is set at approximately 50% of the amplitude between the high and low levels of the edge modified signal. This threshold is raised or lowered in accordance with the analogue signal received from the DAC. The modified pulse is then converted back into a square wave form and exits the width modulator 24 as width modified pulsed signal. The signal then passes to the AOM driver 28.

The AOM driver 28 modulates a radio frequency signal with the width modified pulse signal. The radio frequency signal is generated from a signal generator 29. The modulated signal is then used to drive the transducer 3. The radio frequency signal induces lattice vibrations which propagate through the crystal as an acoustic wave and diffract the laser beam.

One method of generating width modulated data will now be described in connection with FIG. 7.

Figure 7A:
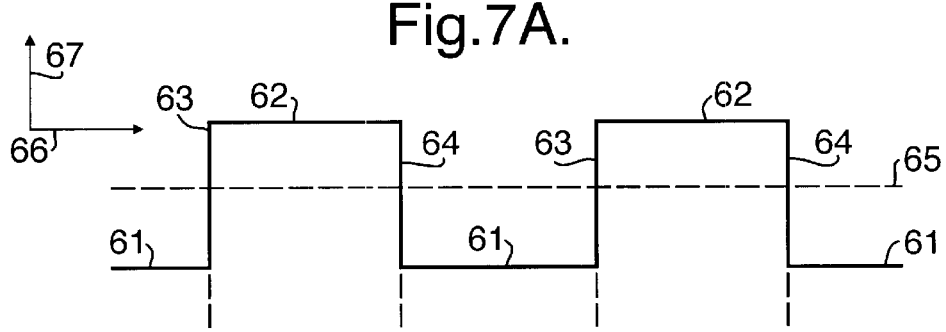
FIGS. 7a to 7c illustrates the modification of the square wave pulse image data signals.

The original pulsed image data takes the form of a series of square wave pulses (see FIG. 7A). The square wave pulses mark transitions between a low level component of the signal 61 and a high level component 62. A number of rise time components 63 mark a transition from the low level to the high level and in general such a transition is very rapid having a very high gradient. Similarly, a transition from the high level component to the low level is effected by a fall time component 64 which is similarly rapid. A threshold level 65 is also marked on the Figure at approximately halfway between the lower and higher level component amplitudes.

Figure 7B:
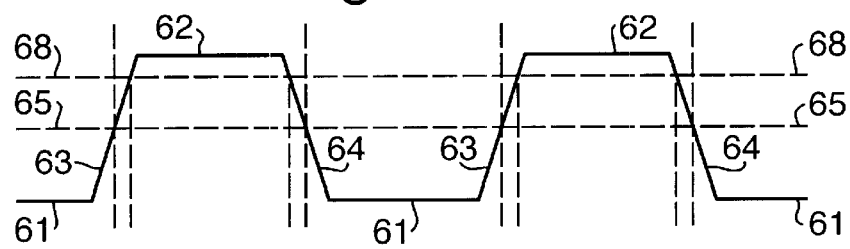

The square wave signal passes into the pulse edge modifier 27 and this causes the rise and fall times 63, 64 to increase in duration at the expense of the time spent at the low and high levels 61, 62. As can be seen in FIG. 7B, the high level component 62 and the corresponding low level component 61 are both shorter in duration, in comparison with those of FIG. 7A.

However, the rise time and fall time components 63 and 64 are expanded in duration along the time axis 66.

The original position of the threshold 65 is indicated in FIG. 7B. However, in accordance with the analogue signal from the processor 21, if the reference signal deviates from a value of zero then the threshold may be moved either upwards or downwards with respect to the amplitude axis 67.

It should be noted that the distance at the threshold level 65 along the time axis 66 between the rise time and fall time components 63, 64 of the signals, is equal to the duration of the high level component 62 of the original unmodified signal.

In this example, the processor 21 in accordance with the look-up table contained in the store 22, determines that the two pulses shown in FIGS. 7A and 7B require to be of shorter duration. The reference signal passed to the width modulator is therefore given a high value thus defining a second threshold 68 in FIG. 7B. As indicated in the Figure, the distance beneath each high level component between the intersection points of this threshold 68 and the corresponding rise and fall components 63, 64 is shortened.

Figure 7C:
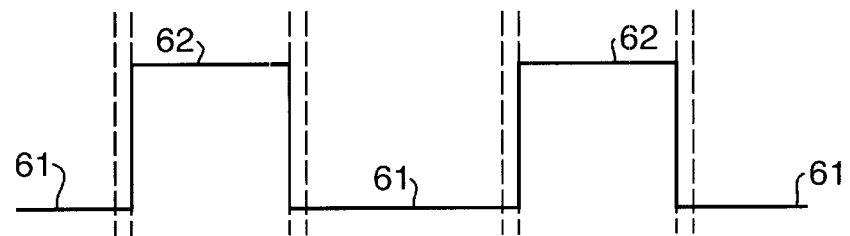

In FIG. 7C, the modified signal is shown reconstituted as a square wave having a high level component 62 duration equal to that of between the intersection points of the threshold 68. The high level components 62 are therefore reduced in duration with respect to the low level components 61 along the time axis 66. In this way the amplitude of the pulses is preserved whereas their width is reduced.

It will be understood that the reference signal may be given a positive or negative polarity and its amplitude may be controlled for each signal processed. Therefore the widths of the image data pulses may be either increased or decreased in accordance with the reference signals.

The corrections to the pulse widths in order to compensate for the apparatus effects can be superposed by the signal processor. As the processor 21 has access to system timers and parameters, the amplitude, phase and frequency of any pulse with modifications can be conveniently controlled in accordance with the look-up table held in the store 22.

I claim:

1. A method of modifying pulsed image data signals for controlling an acousto-optic modulator in an image setter system in which a radiation beam impinging on a record medium is modulated by the acousto-optic modulator, the method comprising:

modifying the pulse widths of the image data signals in accordance with predetermined parameters to improve the correspondence between pulsed image data and the data recorded on the record medium; and supplying the modified pulsed signals to the acousto-optic modulator;

wherein the image data are recorded using the radiation beam wherein relative movement is provided between said radiation beam and said record medium, and wherein each pulse width is modified to compensate for the relative motion between the radiation beam and the record medium, and wherein each pulse is reduced in width by a constant absolute value.

2. A method according to claim 1, wherein the radiation beam is a laser beam.

3. A method according to claim 1, wherein each pulse is a square wave having a high level component, a low level component and rise time and fall time components between the high and low levels; wherein the modification of each received pulse is such that at least one of the rise time and fall time components are expanded and a threshold level of amplitude is defined such that the width of the modified pulse between the intersection points of the threshold level with the rise time and the fall time components is substantially equal to the width of the high level component of the pulse as received; wherein each pulse width is modified by raising or lowering the threshold level in amplitude, causing corresponding modification of the intersection points; and wherein the pulse is converted into a square wave output pulse having a high level component substantially equal in width to the width of the pulse between the intersection points of the modified threshold level with the rise time and fall time components.

4. A method according to claim 1, wherein the pulse widths are modified in accordance with data contained in a look-up table.

5. A method according to claim 1, wherein the relative movement between the radiation beam and the record medium is provided using a rotating spinner.

6. A method of modifying pulsed image data signals for controlling an acousto-optic modulator in an image setter system in which a radiation beam impinging on a record medium is modulated by the acousto-optic modulator, the method comprising:

modifying the pulse widths of the image data signals in accordance with predetermined parameters to improve the correspondence between pulsed image data and the data recorded on the record medium; and supplying the modified pulsed signals to the acousto-optic modulator;

wherein the acousto-optic modulator uses acoustic waves propagating within a crystal to modulate the radiation beam and wherein the pulse widths of the image data signals are varied sinusoidally to compensate for the width modulation of the beam due to the propagation of the acoustic waves.

7. A method according to claim 6, wherein the radiation beam is controlled to move relative to the record medium using a rotating spinner and wherein the frequency of the sinusoidal variations of the pulse widths modification is substantially equal to the rotational frequency of the spinner.

8. A method according to claim 6, wherein each pulse is a square wave having a high level component, a low level component and rise time and fall time components between the high and low levels; wherein the modification of each received pulse is such that at least one of the rise time and fall time components are expanded and a threshold level of amplitude is defined such that the width of the modified pulse between the intersection points of the threshold level with the rise time and the fall time components is substantially equal to the width of the high level component of the pulse as received; wherein each pulse width is modified by raising or lowering the threshold level in amplitude, causing corresponding modification of the intersection points; and wherein the pulse is converted into a square wave output pulse having a high level component substantially equal in width to the width of the pulse between the intersection points of the modified threshold level with the rise time and fall time components.

9. A method according to claim 6, wherein the pulse widths are modified in accordance with data contained in a look-up table.

10. A method according to claim 6, wherein the radiation beam is a laser beam.

11. A method of modifying pulsed image data signals for controlling an acousto-optic modulator in an image setter system in which a radiation beam impinging on a record medium is modulated by the acousto-optic modulator, the method comprising:

modifying the pulse widths of the image data signals in accordance with predetermined parameters to improve the correspondence between pulsed image data and the data recorded on the record medium; and supplying the modified pulsed signals to the acousto-optic modulator;

wherein the modulated beam output from the acousto-optic modulator is elliptical, wherein the radiation beam is controlled to move relative to the record medium using a rotating spinner and the pulse widths of the image data signals are varied sinusoidally with a frequency substantially equal to twice the rotational frequency of the spinner to compensate for the beam ellipticity.

12. A method according to claim 11, wherein each pulse is a square wave having a high level component, a low level component and rise time and fall time components between the high and low levels; wherein the modification of each received pulse is such that at least one of the rise time and fall time components are expanded and a threshold level of amplitude is defined such that the width of the modified pulse between the intersection points of the threshold level with the rise time and the fall time components is substantially equal to the width of the high level component of the pulse as received; wherein each pulse width is modified by raising or lowering the threshold level in amplitude, causing corresponding modification of the intersection points; and wherein the pulse is converted into a square wave output pulse having a high level component substantially equal in width to the width of the pulse between the intersection points of the modified threshold level with the rise time and fall time components.

13. A method according to claim 11, wherein the pulse widths are modified in accordance with data contained in a look-up table.

14. A method according to claim 11, wherein the radiation beam is a laser beam.

15. A radiation beam modulator system for use in an image setter system in which image data are recorded on a record medium using a radiation beam, wherein said image setter system is arranged to provide relative movement between said radiation beam arid said record medium, the radiation beam modulator system comprising:

an acousto-optic modulator for modulating a radiation beam impinging on a record medium;

a signal processor arranged to modify pulsed image data signals for controlling the acousto-optic modulator, by modifying the pulse widths of the image data signals in accordance with predetermined parameters to improve the correspondence between pulsed image data and the data recorded on the record medium; and a store containing a look-up table for controlling the acousto-optic modulator in accordance with the predetermined parameters;

wherein each pulse width is modified to compensate for the relative movement between the radiation beam and the record medium.

16. A radiation beam modulator system according to claim 15, wherein the pulsed image data signals are square wave pulses having a high level component, a low level component and rise time and fall time components between the high and low levels and wherein the signal processor farther comprises an integrator to modify the pulses by expanding at least one of the rise time and fall time components, and a comparator to compare the modified pulses with a reference signal.

17. An image setter system including a radiation beam source, a record medium support, a device for causing relative motion between the radiation beam and the record medium support and a beam modulator system according to claim 15.

18. An image setter system according to claim 17, wherein the device for causing relative motion between the radiation beam and the record medium support is accomplished by providing a spinner arranged to direct the radiation beam across a record medium.

19. An image setter system according to claim 17, wherein the image setter is a drum image setter.

20. A radiation beam modulator system according to claim 15, further comprising a processing unit arranged to synchronize the image data recording with the operation of the acousto-optic modulator.

21. A radiation beam modulator system comprising:
   an acousto-optic modulator for modulating a radiation beam impinging on a record medium; and
   a signal processor arranged to modify pulsed image data signals for controlling the acousto-optic modulator, by modifying the pulse widths of the image data signals in accordance with predetermined parameters to improve the correspondence between pulsed image data and the data recorded on the record medium;
   wherein in use, the acousto-optic modulator uses acoustic waves propagating within a crystal to modulate the radiation beam and wherein the pulse widths of the image data signals are varied sinusoidally to compensate for the width modulation of the beam due to the propagation of the acoustic waves.

22. A radiation beam modulator system according to claim 21, wherein the pulsed image data signals are square wave pulses having a high level component, a low level component and rise time and fall time components between the high and low levels and wherein the signal processor further comprises an integrator to modify the pulses by expanding at least one of the rise time and fall time components, and a comparator to compare the modified pulses with a reference signal.

23. A radiation beam modulator system according to claim 21, wherein the pulsed image data signals are square wave pulses having a high level component, a low level component and rise time and fall time components between the high and low levels and wherein the signal processor further comprises an integrator to modify the pulses by expanding at least one of the rise time and fall time components, and a comparator to compare the modified pulses with a reference signal.

24. A radiation beam modulator system according to claim 21, further comprising a store containing a look-up table for controlling the acousto-optic modulator in accordance with the predetermined parameters.

25. A radiation beam modulator system according to claim 21, further comprising a processing unit arranged to synchronize the image data recording with the operation of the acousto-optic modulator.

26. An image setter system including a radiation beam source, a record medium support, a device for causing relative motion between the radiation beam and the record medium support, and a beam modulator system according to claim 21.

27. An image setter system according to claim 26, wherein the image setter is a drum image setter.

28. A radiation beam modulator system for use in an image setter system in which image data are recorded on a record medium using a radiation beam, said radiation beam being controlled to move relative to the record medium using a rotating spinner, the radiation beam modulator system comprising:
   an acousto-optic modulator for modulating a radiation beam impinging on a record medium; and
   a signal processor arranged to modify pulsed image data signals for controlling the acousto-optic modulator, by modifying the pulse widths of the image data signals in accordance with predetermined parameters to improve the correspondence between pulsed image data and the data recorded on the record medium;
   wherein in use, the modulated beam output from the acousto-optic modulator is elliptical, and wherein the pulse widths of the image data signals are varied sinusoidally with a frequency substantially equal to twice the rotational frequency of the spinner to compensate for the beam ellipticity.

29. A radiation beam modulator system according to claim 28, wherein the pulsed image data signals are square wave pulses having a high level component, a low level component and rise time and fall time components between the high and low levels and wherein the signal processor further comprises an integrator to modify the pulses by expanding at least one of the rise time and fall time components, and a comparator to compare the modified pulses with a reference signal.

30. A radiation beam modulator system according to claim 28, further comprising a store containing a look-up table for controlling the acousto-optic modulator in accordance with the predetermined parameters.

31. A radiation beam modulator system according to claim 28, further comprising a processing unit arranged to synchronize the image data recording with the operation of the acousto-optic modulator.

32. An image setter system including a radiation beam source, a record medium support, a device for causing relative motion between the radiation beam and the record medium support, and a beam modulator system according to claim 28.

33. An image setter system according to claim 32, wherein the image setter is a drum image setter.

* * * * *